（12） United States Patent  
Kubo

(10) Patent No.: US 7,452,576 B2  
(45) Date of Patent: Nov. 18, 2008

(54) LIQUID CRYSTAL COMPOSITION AND LIQUID CRYSTAL DISPLAY DEVICE

(75) Inventor: Yasuhiro Kubo, Chiba (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 77 days.

(21) Appl. No.: 11/642,650

(22) Filed: Dec. 21, 2006

(65) Prior Publication Data

US 2007/0145331 A1    Jun. 28, 2007

(30) Foreign Application Priority Data

Dec. 22, 2005    (JP)    ............................ 2005-369142

(51) Int. Cl.
  *C09K 19/34* (2006.01)
  *C09K 19/30* (2006.01)
  *C09K 19/20* (2006.01)

(52) U.S. Cl. .............. 428/1.1; 252/299.61; 252/299.63; 252/299.67

(58) Field of Classification Search ................... 428/1.1; 252/299.61, 299.63, 299.67  
See application file for complete search history.

(56) References Cited

U.S. PATENT DOCUMENTS

| 5,328,642 | A  | * | 7/1994  | Rieger et al.      | 252/299.63 |
|-----------|----|---|---------|--------------------|------------|
| 6,582,782 | B2 | * | 6/2003  | Heckmeier et al.   | 428/1.1    |
| 6,800,338 | B2 | * | 10/2004 | Jacob et al.       | 428/1.3    |
| 6,902,777 | B2 | * | 6/2005  | Hirschmann et al.  | 428/1.1    |
| 7,109,381 | B2 | * | 9/2006  | Poetsch et al.     | 568/442    |
| 2003/0213935 | A1 |  | 11/2003 | Heckmeier et al. | |

FOREIGN PATENT DOCUMENTS

| DE | 102 29 476 A1 |   | 2/2003  |
|----|---------------|---|---------|
| DE | 10 2004 019901 A1 |   | 11/2004 |
| DE | 102004020461  | * | 12/2004 |
| EP | 0 844 229 A1  |   | 5/1998  |
| JP | 2004-352992 A |   | 12/2004 |

OTHER PUBLICATIONS

English translation by computer for JP 2004352992, http://www4.ipdl.inpit.go.jp/Tokujitu/PAJdetail.ipdl?N0000132 60&N0120=01 &N2001=2&N3001=2004-352992.*

English translation provided by EPO for DE-102004019901.*  
European Search Report dated Mar. 22, 2007 in related European Application No. EP 06256393.

* cited by examiner

*Primary Examiner*—Shean C Wu  
(74) *Attorney, Agent, or Firm*—Hogan & Hartson LLP

(57) ABSTRACT

A liquid crystal composition, and a liquid crystal display containing the same, having a nematic phase including three components, wherein the first component is at least one compound selected from the group of compounds represented by formula (1), the second component is at least one compound selected from the group of compounds represented by formula (2), and the third component is at least one compound selected from the group of compounds represented by formula (3):

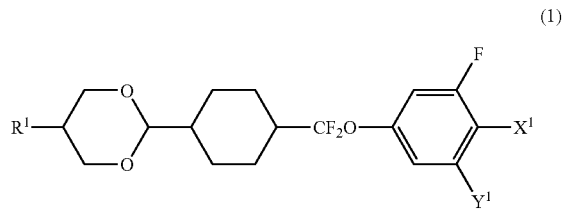

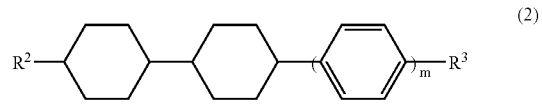

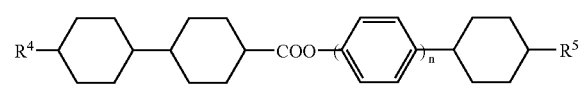

wherein $R^1$ and $R^2$ are each independently alkyl having approximately 1 to approximately 12 carbons or alkenyl having approximately 2 to approximately 12 carbons; $R^3$ is alkyl having approximately 1 to approximately 12 carbons or alkoxy having approximately 1 to approximately 12 carbons; $R^4$ and $R^5$ are each independently alkyl having approximately 1 to approximately 12 carbons; $X^1$ is fluorine, chlorine, $-OCF_2H$, $-CF_3$ or $-OCF_3$; $Y^1$ is hydrogen or fluorine; and m and n are each independently 0 or 1.

15 Claims, No Drawings

LIQUID CRYSTAL COMPOSITION AND LIQUID CRYSTAL DISPLAY DEVICE

CROSS REFERENCE TO RELATED APPLICATIONS

This application claims priority under 35 U.S.C. §119 to Japanese Patent Application No. JP 2005-369142, filed Dec. 22, 2005, which is expressly incorporated herein by reference in its entirety.

BACKGROUND OF THE INVENTION

1. Field of the Invention

The invention relates to a liquid crystal composition suitable for use mainly in an active matrix (AM) device, and an AM device containing the composition. The composition has a nematic phase and a positive dielectric anisotropy.

2. Related Art

In a liquid crystal display device, classification based on the operating mode of liquid crystals includes phase change (PC), twisted nematic (TN), super twisted nematic (STN), electrically controlled birefiingence (ECB), optically compensated bend (OCB), in-plane switching (IPS), vertical alignment (VA), and so forth. Classification based on the driving mode includes a passive matrix (PM) and an active matrix (AM). PM is further classified into static, multiplex and so forth, and AM is classified into a thin film transistor UM, a metal insular metal (MIM) and so forth. TFT is further classified into amorphous silicon and polycrystal silicon. The latter is classified into a high temperature type and a low temperature type according to a production process. Classification based on a light source includes a reflection type utilizing a natural light, a transmission type utilizing a backlight and a semi-transmission type utilizing both the natural light and the backlight.

These devices contain a liquid crystal composition having suitable characteristics. The liquid crystal composition has a nematic phase. General characteristics of the composition should be improved to obtain an AM device having good general characteristics. Table 1 below summarizes the relationship between the general characteristics of the two. The general characteristics of the composition will be explained further based on a commercially available AM device. A temperature range of a nematic phase relates to the temperature range in which the device can be used. A desirable maximum temperature of the nematic phase is approximately 70° C. or more and a desirable minimum temperature is approximately −10° C. or less. The viscosity of the composition relates to the response time of the device. A short response time is desirable for displaying a moving image. Accordingly, a small viscosity of the composition is desirable. A small viscosity at a low temperature is more desirable.

TABLE 1

General Characteristics of a Liquid Crystal Composition and AM Device

| No. | General Characteristics of a Composition | General Characteristics of an AM Device |
|---|---|---|
| 1 | Temperature range of a nematic phase is wide | Usable temperature range is wide |
| 2 | Viscosity is small[1] | Response time is short |
| 3 | Optical anisotropy is suitable | Contrast ratio is large |
| 4 | Dielectric anisotropy is large | Threshold voltage is low, electric power consumption is small, and contrast ratio is large |

TABLE 1-continued

General Characteristics of a Liquid Crystal Composition and AM Device

| No. | General Characteristics of a Composition | General Characteristics of an AM Device |
|---|---|---|
| 5 | Specific resistance is large | Voltage holding ratio is large and a contrast ratio is large |
| 6 | It is stable to ultraviolet light and heat | Service life is long |

Note:
[1]A liquid crystal composition can be injected into a cell in a short time.

The optical anisotropy of the composition relates to the contrast ratio of the device. A product (Δn·d) of the optical anisotropy (Δn) of the composition and the cell gap (d) of the device is designed to maximize the contrast ratio. A suitable value of the product depends on the kind of operation mode. In a device having a TN mode and so forth, a suitable value is approximately 0.45 μm. In this case, a composition having a large optical anisotropy is desirable for a device having a small cell gap. A large dielectric anisotropy of the composition contributes to a low threshold voltage, a small electric power consumption and a large contrast ratio of the device. Accordingly, a large electric anisotropy is desirable. A large specific resistance of the composition contributes to a large voltage holding ratio and a large contrast ratio of the device. Accordingly, a composition having a large specific resistance is desirable at room temperature and also at a high temperature in the initial stage. A composition having a large specific resistance is desirable at room temperature and also at a high temperature after it has been used for a long time. A stability of the composition to an ultraviolet light and heat relates to a service life of the liquid crystal display device. In the case where the stability is high, the device has a long service life. These characteristics are desirable to an AM device used for a liquid crystal projector, a liquid crystal television and so forth.

Conventional compositions are disclosed in, for example, the following patent documents. JPH10-204016 A/1998, JP2003-176251 A/2003 and JP2004-352992 A/2004.

A desirable AM device is characterized as having a usable temperature range that is wide, a response time that is short, a contrast ratio that is large, a threshold voltage that is low, a voltage holding ratio that is large, a service life that is long, and so forth. Even one millisecond shorter response time is desirable. Thus, the composition having characteristics such as a high maximum temperature of a nematic phase, a low minimum temperature of a nematic phase, a small viscosity, suitable optical anisotropy, a large dielectric anisotropy, a large specific resistance, a high stability to an ultraviolet light, a high stability to heat, and so forth is especially desirable.

SUMMARY OF THE INVENTION

The invention relates to a liquid crystal composition that includes a nematic phase that includes three components, wherein the first component is at least one compound selected from the group of compounds represented by formula (1), the second component is at least one compound selected from the group of compounds represented by formula (2), and the third component is at least one compound selected from the group of compounds represented by formula (3):

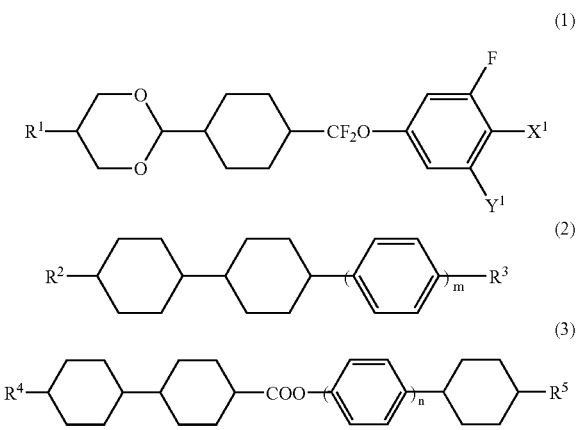

wherein $R^1$ and $R^2$ are each independently alkyl having approximately 1 to approximately 12 carbons or alkenyl having approximately 2 to approximately 12 carbons; $R^3$ is alkyl having approximately 1 to approximately 12 carbons or alkoxy having approximately 1 to approximately 12 carbons; $R^4$ and $R^5$ are each independently alkyl having approximately 1 to approximately 12 carbons; $X^1$ is fluorine, chlorine, $-OCF_2H$, $-CF_3$ or $-OCF_3$; $Y^1$ is hydrogen or fluorine; and m and n are each independently 0 or 1.

The invention also relates to a liquid crystal display device that includes the liquid crystal composition, and so forth.

DETAILED DESCRIPTION OF THE INVENTION

The terms used in the specification and claims are as follows: The liquid crystal composition and/or the liquid crystal display device of the invention may occasionally be expressed simply as "the composition" or "the device," respectively. A liquid crystal display device is a generic term for a liquid crystal display panel and a liquid crystal display module. The "liquid crystal compound" is a generic term for a compound having a liquid crystal phase such as a nematic phase, a smectic phase and so forth, and also for a compound having no liquid crystal phase but being useful as a component of a composition. The useful compound contains a 6-membered ring such as 1,4-cyclohexylene and 1,4-phenylene, and a rod-like molecular structure. An optically active compound may occasionally be added to the composition. Even in the case where the compound is a liquid crystal compound, the compound is classified into an additive. At least one compound selected from a group of compounds represented by formula (1) may be abbreviated to "the compound (1)." The group of compounds represented by formula (1) may also be abbreviated to "the compound (1)." The other formulas are applied with the same rules.

A higher limit of a temperature range of a nematic phase may be abbreviated to "a maximum temperature." A lower limit of a temperature range of a nematic phase may be abbreviated to "a minimum temperature." "A specific resistance is large" means that the composition has a large specific resistance at room temperature and also at a high temperature in the initial stage, the composition has a large specific resistance at room temperature and also at a high temperature even after it has been used for a long time. "A voltage holding ratio is large" means that a device has a large voltage holding ratio at room temperature and also at a high temperature in the initial stage, the device has a large voltage holding ratio at room temperature and also at a high temperature even after it has been used for a long time. In the description of the characteristics such as optical anisotropy, the characteristics of the composition such as the optical anisotropy and so forth are values measured in the methods disclosed in Examples. "A ratio of the first component" means the percentage by weight (% by weight) based on the total weight of liquid crystal compounds. A ratio of the second component and so forth are applied with the same rule. A ratio of an additive mixed with the composition means the percentage by weight (% by weight) based on the total weight of liquid crystal compounds.

One of the advantages of the invention is to provide a liquid crystal composition that satisfies many characteristics among the characteristics such as a high maximum temperature of a nematic phase, a low minimum temperature of a nematic phase, a small optical anisotropy, a large dielectric anisotropy, a large specific resistance, a high stability to ultraviolet light and a high stability to heat. Another of the advantages of the invention is to provide a liquid crystal composition that is properly balanced regarding many characteristics. Another of the advantages of the invention is to provide a liquid crystal display device that contains the liquid crystal composition. One aspect of the invention is to provide a liquid crystal composition that has a low threshold voltage, an optical anisotropy of from approximately 0.06 to approximately 0.10, a high stability to heat and so forth, and is to provide an AM device that has a short response time, a large voltage holding ratio, a large contrast ratio, a long service life and so forth.

The invention relates to a liquid crystal composition having a nematic phase and including three components, wherein the first component is at least one compound selected from the group of compounds represented by formula (1), the second component is at least one compound selected from the group of compounds represented by formula (2), and the third component is at least one compound selected from the group of compounds represented by formula (3), and also relates to a liquid crystal display device containing the composition:

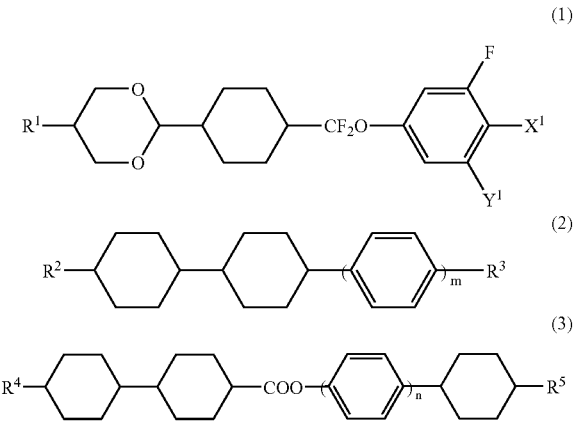

wherein $R^1$ and $R^2$ are each independently alkyl having approximately 1 to approximately 12 carbons or alkenyl having approximately 2 to approximately 12 carbons; $R^3$ is alkyl having approximately 1 to approximately 12 carbons or alkoxy having approximately 1 to approximately 12 carbons; $R^4$ and $R^5$ are each independently alkyl having approximately 1 to approximately 12 carbons; $X^1$ is fluorine, chlorine, —OCF$_2$H, —CF$_3$ or —OCF$_3$; Y$^1$ is hydrogen or fluorine; and m and n are each independently 0 or 1.

The liquid crystal composition of the invention satisfies many characteristics among the characteristics such as a high maximum temperature of a nematic phase, a low minimum temperature of a nematic phase, a small optical anisotropy, a large dielectric anisotropy, a large specific resistance, a high stability to ultraviolet light and a high stability to heat. The composition is properly balanced regarding many characteristics. The liquid crystal display device of the invention includes the liquid crystal composition. The composition has a low threshold voltage, an optical anisotropy of from approximately 0.06 to approximately 0.10, a high stability to heat and so forth, and is suitable for an AM device that has a short response time, a large voltage holding ratio, a large contrast ratio, a long service life and so forth.

The invention includes the following features:

1. A liquid crystal composition having a nematic phase that includes three components, wherein the first component is at least one compound selected from the group of compounds represented by formula (1), the second component is at least one compound selected from the group of compounds represented by formula (2), and the third component is at least one compound selected from the group of compounds represented by formula (3):

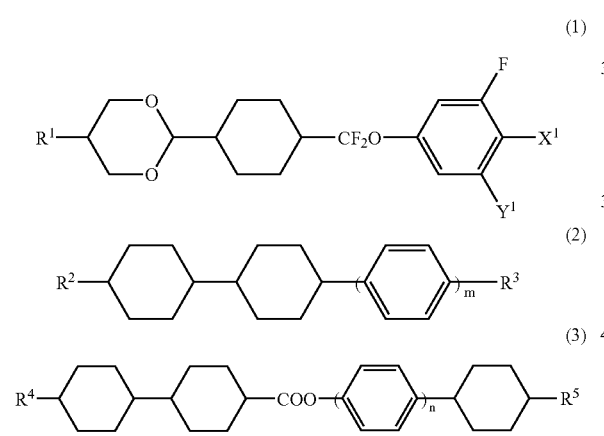

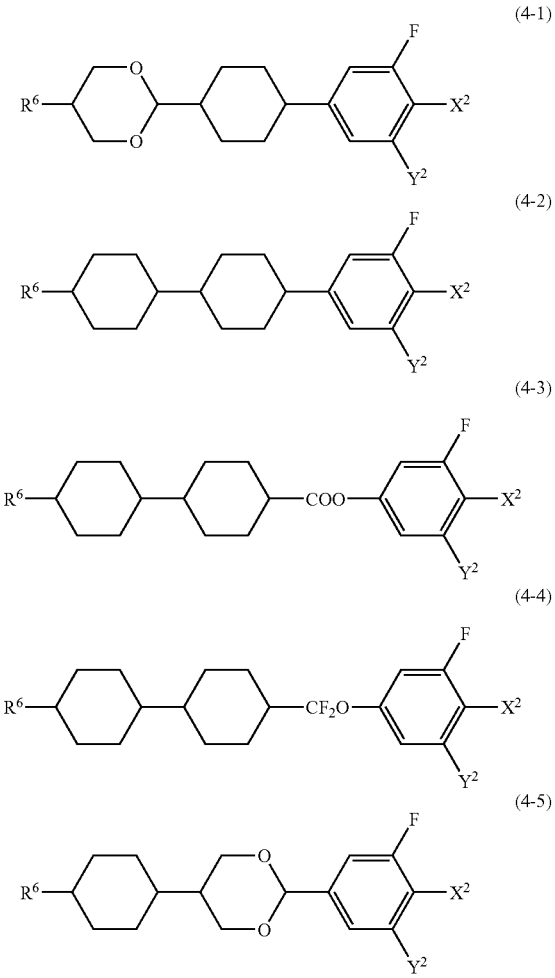

wherein R$^1$ and R$^2$ are each independently alkyl having approximately 1 to approximately 12 carbons or alkenyl having approximately 2 to approximately 12 carbons; R$^3$ is alkyl having approximately 1 to approximately 12 carbons or alkoxy having approximately 1 to approximately 12 carbons; R$^4$ and R$^5$ are each independently alkyl having approximately 1 to approximately 12 carbons; X$^1$ is fluorine, chlorine, —OCF$_2$H, —CF$_3$ or —OCF$_3$; Y$^1$ is hydrogen or fluorine; and m and n are each independently 0 or 1.

The liquid crystal composition according to item 1, wherein the ratio of the first component is in a range of from approximately 5% to approximately 40% by weight, the ratio of the second component is in a range of from approximately 5% to approximately 70% by weight, and the ratio of the third component is in a range of from approximately 5% to approximately 30% by weight, based on the total weight of the liquid crystal compounds.

3. The liquid crystal composition according to item 1, wherein the liquid crystal composition further includes at least one compound selected from the group of compounds represented by formulas (4-1) to (4-5) as a fourth component:

wherein R$^6$ is alkyl having approximately 1 to approximately 12 carbons; X$^2$ is fluorine, chlorine, —OCF$_2$H, —CF$_3$ or —OCF$_3$; and Y$^2$ is hydrogen or fluorine.

The liquid crystal composition according to item 3, wherein the ratio of the first component is in a range of from approximately 5% to approximately 40% by weight, the ratio of the second component is in a range of from approximately 5% to approximately 70% by weight, the ratio of the third component is in a range of from approximately 5% to approximately 30% by weight, and the ratio of the fourth component is in a range of from approximately 5% to approximately 80% by weight, based on the total weight of the liquid crystal compounds.

5. A liquid crystal composition having a nematic phase including four components, wherein the first component is at least one compound selected from the group of compounds represented by formula (1), the second component is at least one compound selected from the group of compounds represented by formula (2), the third component is at least one compound selected from the group of compounds represented by formula (3), the fourth component is at least one compound selected from the group of compounds represented by formulas (4-1) to (4-5), and the liquid crystal composition consisting essentially of the first component, the second component, the third component and the fourth component:

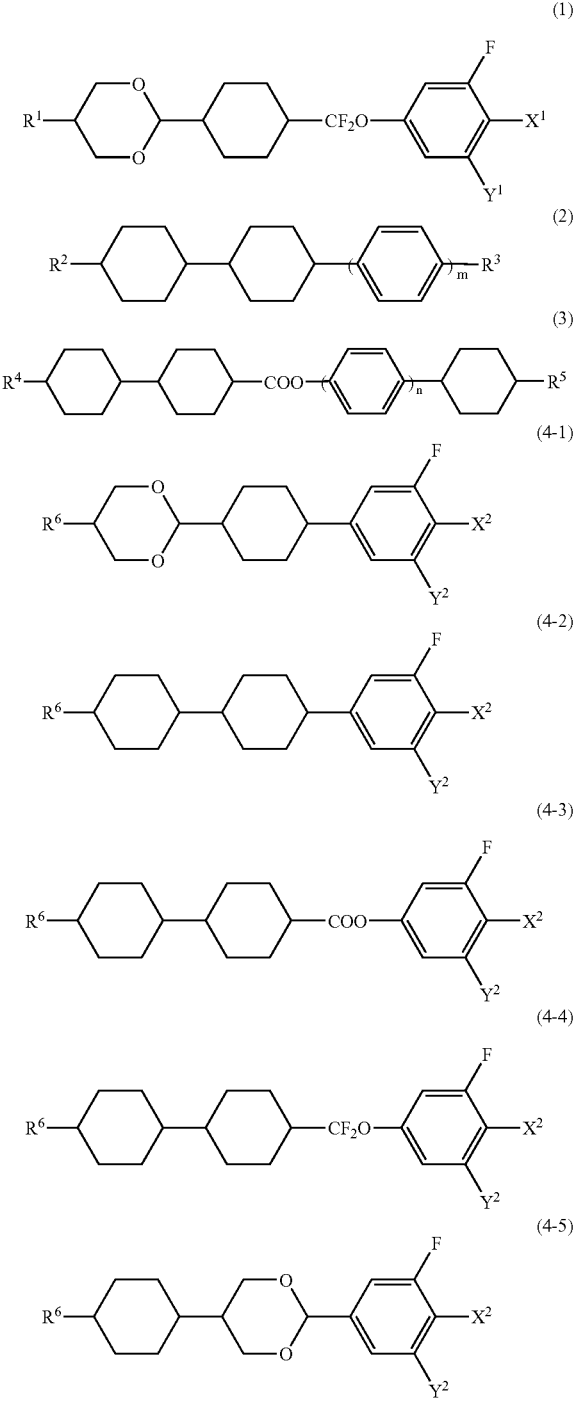

wherein R¹ and R² are each independently alkyl having approximately 1 to approximately 12 carbons or alkenyl having approximately 2 to approximately 12 carbons; R³ is alkyl having approximately 1 to approximately 12 carbons or alkoxy having approximately 1 to approximately 12 carbons; R⁴ and R⁵ are each independently alkyl having approximately 1 to approximately 12 carbons; R⁶ is alkyl having approximately 1 to approximately 12 carbons; X¹ and X² are each independently fluorine, chlorine, —OCF₂H, —CF₃ or —OCF₃; Y¹ and Y² are each independently hydrogen or fluorine; and m and n are each independently 0 or 1.

The liquid crystal composition according to item 5, wherein the ratio of the first component is in a range of from approximately 5% to approximately 40% by weight, the ratio of the second component is in a range of from approximately 5% to approximately 70% by weight, the ratio of the third component is in a range of from approximately 5% to approximately 30% by weight, and the ratio of the fourth component is in a range of from approximately 5% to approximately 80% by weight, based on the total weight of the liquid crystal compounds.

7. A liquid crystal composition having a nematic phase including four components, wherein the first component is at least one compound selected from the group of compounds represented by formula (1), the second component is at least one compound selected from the group of compounds represented by formula (2), the third component is at least one compound selected from the group of compounds represented by formula (3), the fourth component is at least one compound selected from the group of compounds represented by formulas (4-2) and (4-4), and the liquid crystal composition consisting essentially of the first component, the second component, the third component and the fourth component:

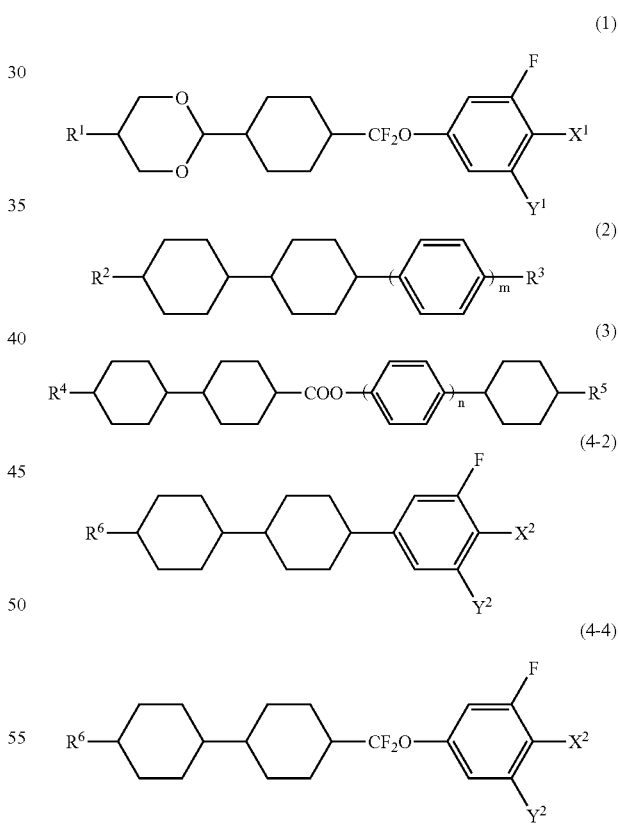

wherein R¹ and R² are each independently alkyl having approximately 1 to approximately 12 carbons or alkenyl having approximately 2 to approximately 12 carbons; R³ is alkyl having approximately 1 to approximately 12 carbons or alkoxy having approximately 1 to approximately 12 carbons; R⁴ and R⁵ are each independently alkyl having approximately 1 to approximately 12 carbons; R⁶ is alkyl having approximately 1 to approximately 12 carbons; $X^1$ and $X^2$ are each independently fluorine, chlorine, —$OCF_2H$, —$CF_3$ or —$OCF_3$; $Y^1$ and $Y^2$ are each independently hydrogen or fluorine; and m and n are each independently 0 or 1.

The liquid crystal composition according to any one of items 1 to 7, wherein the liquid crystal composition further includes an ultraviolet light absorbent.

9. A liquid crystal display device that includes the liquid crystal composition according to any one of items 1 to 8.

The invention has the following features; (1) the composition described above, wherein the composition further includes an optically active compound; (2) the composition described above, wherein the composition further includes an additive, such as an antioxidant; an ultraviolet light absorbent and a antifoaming agent; (3) an AM device that includes the composition described above; (4) a device having a TN, ECB, OCB or IPS mode, that includes the composition described above; (5) a device of a transmission type, that includes the composition described above; (6) use of the composition described above as a composition having a nematic phase; and (7) use as an optically active composition by adding an optically active compound to the composition described above.

so forth. The impurity is a compound and so forth contaminated in the process such as the synthesis of a component compound and so forth.

The composition B essentially consists of the compounds selected from the compound (1), the compound (2), the compound (3) and the compounds (4-1) to (4-5). The term "essentially" means that the composition does not contain a liquid crystal compound which is different from these compounds, but may further contain other compounds (e.g., an additive, an impurity, and so forth). The components of the composition B are fewer than those of the composition A. The composition B is preferable to the composition A from the viewpoint of costs. The composition A is preferable to the composition B, because characteristics of the composition A can be further adjusted by mixing with other liquid crystal compounds.

Second, the main characteristics of the component compounds and the main effects of the compounds on the composition will be explained. The main characteristics of the component compounds are summarized in Table 2. In Table 2, the symbol L represents large or high, the symbol M represents a middle degree, and the symbol S represents small or low. The symbols S, M and L are classification based on qualitative comparison among the component compounds.

TABLE 2

| | Characteristics of Compounds | | | | | | | |
|---|---|---|---|---|---|---|---|---|
| | Compound (1) | Compound (2) | Compound (3) | Compound (4-1) | Compound (4-2) | Compound (4-3) | Compound (4-4) | Compound (4-5) |
| Maximum Temperature | L | S | L | M | L | L | L | M |
| Viscosity | M | S | L | M | S | L | S | M |
| Optical Anisotropy | S | S | M | S | S | S | S | S |
| Dielectric Anisotropy | L | S | S | L | M | L | L | L |
| Specific Resistance | M | L | L | L | L | M | L | L |
| Heat Stability | L | L | L | L | L | M | L | L |

The composition of the invention will be explained in the following order. First, the constitution of component compounds in the composition will be explained. Second, the main characteristics of the component compounds and the main effects of the compounds on the composition will be explained. Third, a desirable ratio of the component compounds and the basis thereof will be explained. Fourth, a desirable embodiment of the component compounds will be explained. Fifth, examples of the component compound will be shown. Sixth, the preparation methods of the component compound will be explained. Seventh, additives that may be added to the composition will be explained. Lastly, use of the composition will be explained.

First, the constitution of component compounds in the composition will be explained. The composition of the invention is classified into the composition A and the composition B. The composition A may further include a liquid crystal compound, an additive, an impurity, and so forth. This liquid crystal compound is different from the compound (1), the compound (2), the compound (3) and the compounds (4-1) to (4-5). Such a compound is mixed with the composition for the purpose of adjusting the characteristics of the composition.

The additive includes an optically active compound, a coloring matter, an antioxidant, an ultraviolet light absorbent and The main effects of the component compounds to the characteristics of the composition upon mixing the component compounds to the composition are as follows. The compound (1) decreases the optical anisotropy and increases the dielectric anisotropy. The compound (2) decreases the optical anisotropy and decrease a viscosity. The compound (3) increases the maximum temperature. The compounds (4-1) to (4-5) increase the dielectric anisotropy of the composition.

Third, desirable ratios of the component compounds and the basis therefore will be explained. A desirable ratio of the first component is approximately 5% by weight or more for decreasing the optical anisotropy and increasing the dielectric anisotropy, and is approximately 40% by weight or less for decreasing the minimum temperature. A more desirable ratio is from approximately 10% to approximately 35%. A further desirable ratio is from approximately 10% to approximately 30%.

A desirable ratio of the second component is approximately 5% by weight or more for decreasing the viscosity, and is approximately 70% by weight or less for increasing the maximum temperature. A more desirable ratio is from approximately 20% to approximately 70%. A further desirable ratio is from approximately 20% to approximately 60%.

A desirable ratio of the third component is approximately 5% by weight or more for increasing the maximum temperature, and is approximately 30% by weight or less for decreasing the minimum temperature and decreasing the viscosity. A more desirable ratio is from approximately 10% to approximately 30%. A further desirable ratio is from approximately 10% to approximately 25%.

The fourth component is suitable for preparing a composition having a particularly large dielectric anisotropy. A desirable ratio of the fourth component is approximately 5% by weight or more for increasing the dielectric anisotropy, and is approximately 80% by weight or less for decreasing the minimum temperature. A more desirable ratio is from approximately 5% by weight to approximately 70%. A further desirable ratio is from approximately 10% to approximately 65%.

In the composition A described above, a desirable total ratio of the first component, the second component, the third component and the fourth component is approximately 70% by weight or more for obtaining good characteristics. A more desirable total ratio is approximately 90% by weight or more. In the composition B described above, a total ratio of the four components is 100%.

Fourth, a desirable embodiment of the component compound will be explained. $R^1$ and $R^2$ are each independently alkyl having approximately 1 to approximately 12 carbons or alkenyl having approximately 2 to approximately 12 carbons. $R^3$ is alkyl having approximately 1 to approximately 12 carbons or alkoxy having approximately 1 to approximately 12 carbons. $R^4$ to $R^6$ are each independently alkyl having approximately 1 to approximately 12 carbons. Desirable $R^4$ to $R^6$ are linear alkyl having approximately 1 to approximately 10 carbons.

Desirable alkyl are methyl, ethyl, propyl, butyl, pentyl, hexyl, heptyl, or octyl. More desirable alkyl are ethyl, propyl, butyl, pentyl, or heptyl for decreasing the viscosity.

Desirable alkenyl are vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl are vinyl, 1-propenyl, 3-butenyl, or 3-pentenyl for decreasing the viscosity. A desirable configuration of —CH=CH— in these alkenyls depends on the position of the double bond. Trans is desirable in the alkenyl such as 1-propenyl, 1-butenyl, 1-pentenyl, 1-hexenyl, 3-pentenyl, and 3-hexenyl for decreasing a viscosity. Cis is desirable in the alkenyl such as 2-butenyl, 2-pentenyl and 2-hexenyl. In these alkenyls, linear alkenyl is preferable to branched alkenyl.

Desirable alkoxy are methoxy, ethoxy, propoxy, butoxy, pentyloxy, hexyloxy, heptyloxy, or octyloxy. More desirable alkoxy are methoxy, ethoxy, propoxy, or butoxy for decreasing the viscosity.

$X^1$ and $X^2$ are each independently fluorine, chlorine, —OCF$_2$H, —CF$_3$ or —OCF$_3$. Desirable $X^1$ and $X^2$ are fluorine or trifluoromethoxy (—OCF$_3$) for increasing the dielectric anisotropy and increasing the stability to heat.

$Y^1$ and $Y^2$ are each independently hydrogen or fluorine. Desirable $Y^1$ and $Y^2$ are fluorine for increasing the dielectric anisotropy and decreasing the minimum temperature.

Fifth, examples of the component compounds will be shown. In the desirable compounds described below, trans is preferable to cis for the configuration of 1,4-cyclohexylene for increasing the maximum temperature. The symbol $R^1$ is used for many compounds in the chemical formulas for the component compounds. $R^1$ may be identical or different in these compounds. In one case, for example, $R^1$ of the compound (1-1) is ethyl and $R^1$ of the compound (1-2) is ethyl. In another case, $R^1$ of the compound (1-1) is ethyl and $R^1$ of the compound (1-2) is propyl. This rule is also applicable to the symbols $R^2$, $R^3$, and so forth.

Desirable compound (1) are the compounds (1-1) to (1-3). More desirable compound (1) is the compound (1-2) for increasing the dielectric anisotropy and decreasing the viscosity. Desirable compound (2) are the compounds (2-1) to (2-4). More desirable compound (2) is the compound (2-2) for decreasing the optical anisotropy and decreasing the minimum temperature.

Desirable compound (3) are the compounds (3-1) and (3-2). Desirable compound (4-1) are the compounds (4-1-1) to (4-1-10). More desirable compound (4-1) are the compounds (4-1-5) and (4-1-6) for increasing the dielectric anisotropy and decreasing the viscosity. Desirable compound (4-2) are the compounds (4-2-1) to (4-2-10). More desirable compound (4-2) are the compounds (4-2-5) and (4-2-6) increasing the dielectric anisotropy and decreasing the viscosity. Desirable compound (4-3) are the compounds (4-3-1) to (4-3-10). More desirable compound (4-3) are the compounds (4-3-5) and (4-3-6) for increasing the dielectric anisotropy and decreasing the viscosity. Desirable compound (44) are the compounds (4-4-1) to (4-4-10). More desirable compound (4-4) are the compounds (4-4-5) and (4-4-6) for increasing the dielectric anisotropy and decreasing the viscosity. Desirable compound (4-5) are the compounds (4-5-1) to (4-5-10). More desirable compound (4-5) are the compounds (4-5-5) and (4-5-6) for increasing the dielectric anisotropy and decreasing the viscosity.

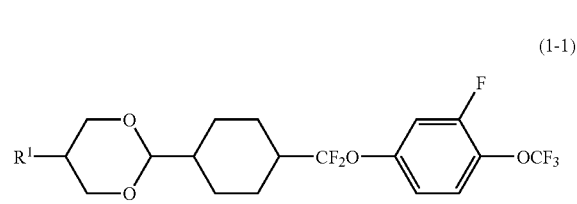

(1-1)

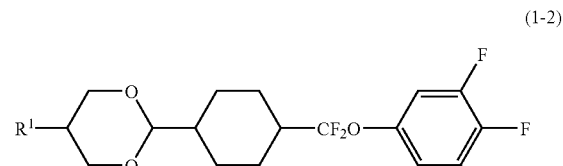

(1-2)

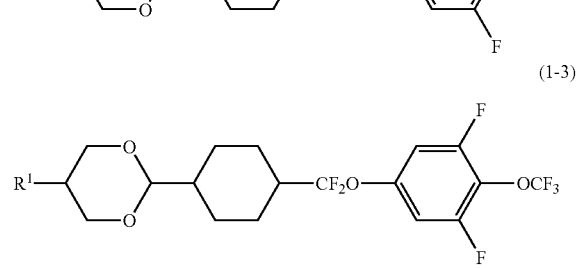

(1-3)

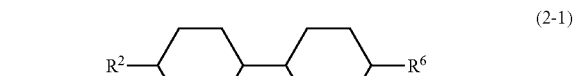

(2-1)

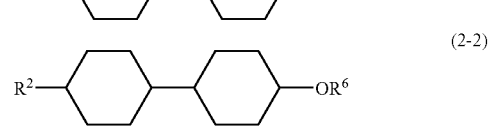

(2-2)

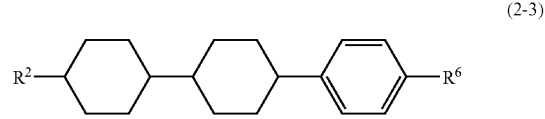

(2-3)

(2-4)
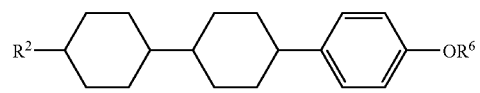
(3-1)
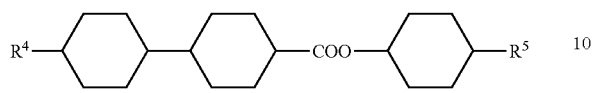
(3-2)
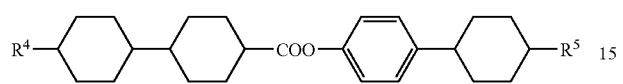
(4-1-1)
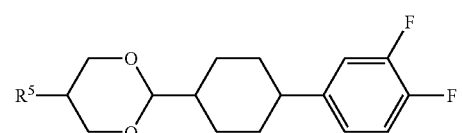
(4-1-2)
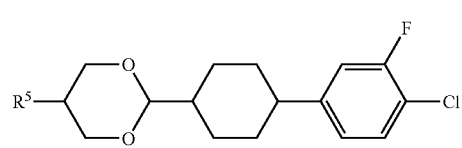
(4-1-3)
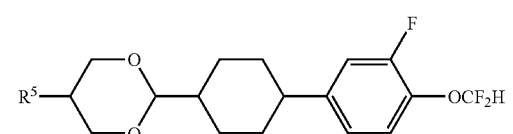
(4-1-4)
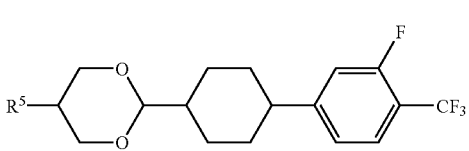
(4-1-5)
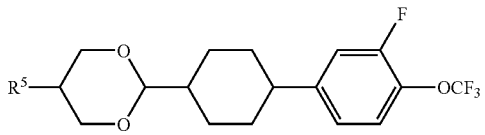
(4-1-6)
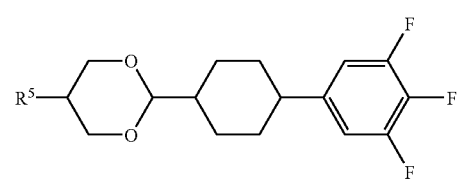
(4-1-7)
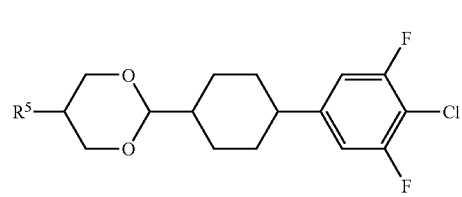
(4-1-8)
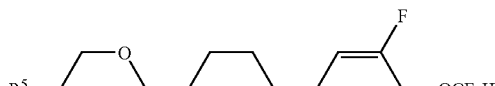
(4-1-9)
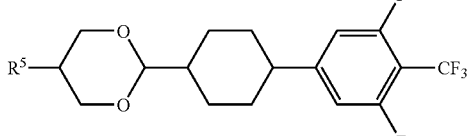
(4-1-10)
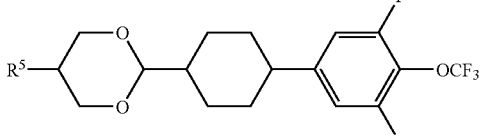
(4-2-1)
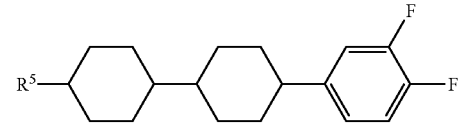
(4-2-2)
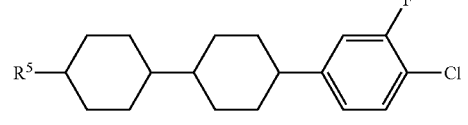
(4-2-3)
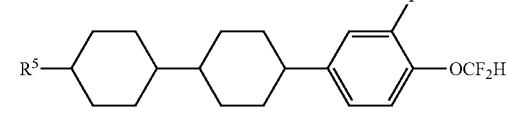
(4-2-4)
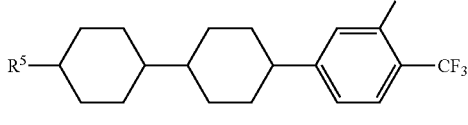
(4-2-5)
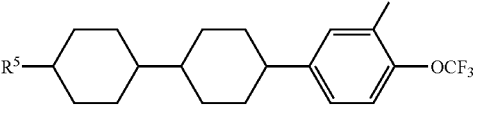
(4-2-6)
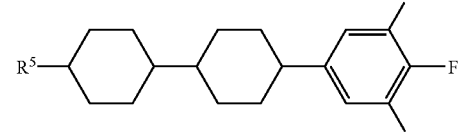

-continued (4-2-7) R⁵–[Cy]–[Cy]–[Ph(2,6-F,4-Cl)]

(4-2-8) R⁵–[Cy]–[Cy]–[Ph(2,6-F,4-OCF₂H)]

(4-2-9) R⁵–[Cy]–[Cy]–[Ph(2,6-F,4-CF₃)]

(4-2-10) R⁵–[Cy]–[Cy]–[Ph(2,6-F,4-OCF₃)]

(4-3-1) R⁵–[Cy]–[Cy]–COO–[Ph(3,4-F)]

(4-3-2) R⁵–[Cy]–[Cy]–COO–[Ph(3-F,4-Cl)]

(4-3-3) R⁵–[Cy]–[Cy]–COO–[Ph(3-F,4-OCF₂H)]

(4-3-4) R⁵–[Cy]–[Cy]–COO–[Ph(3-F,4-CF₃)]

(4-3-5) R⁵–[Cy]–[Cy]–COO–[Ph(3-F,4-OCF₃)]

(4-3-6) R⁵–[Cy]–[Cy]–COO–[Ph(3,4,5-F)]

(4-3-7) R⁵–[Cy]–[Cy]–COO–[Ph(3,5-F,4-Cl)]

(4-3-8) R⁵–[Cy]–[Cy]–COO–[Ph(3,5-F,4-OCF₂H)]

(4-3-9) R⁵–[Cy]–[Cy]–COO–[Ph(3,5-F,4-CF₃)]

(4-3-10) R⁵–[Cy]–[Cy]–COO–[Ph(3,5-F,4-OCF₃)]

(4-4-1) R⁵–[Cy]–[Cy]–CF₂O–[Ph(3,4-F)]

(4-4-2) R⁵–[Cy]–[Cy]–CF₂O–[Ph(3-F,4-Cl)]

(4-4-3) R⁵–[Cy]–[Cy]–CF₂O–[Ph(3-F,4-OCF₂H)]

-continued (4-4-4)
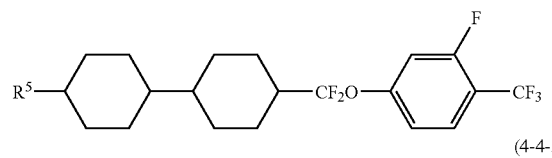

(4-4-5)
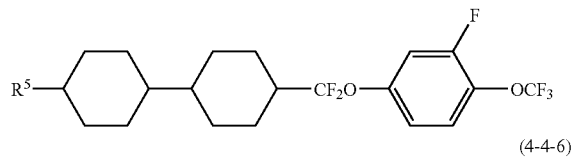

(4-4-6)
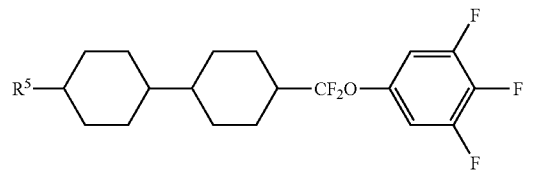

(4-4-7)
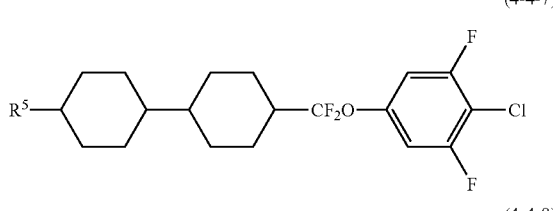

(4-4-8)
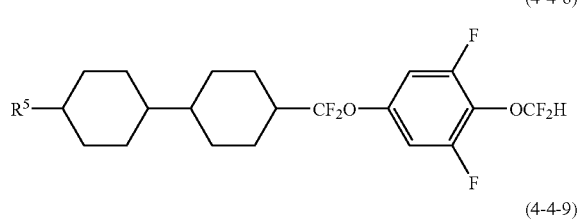

(4-4-9)
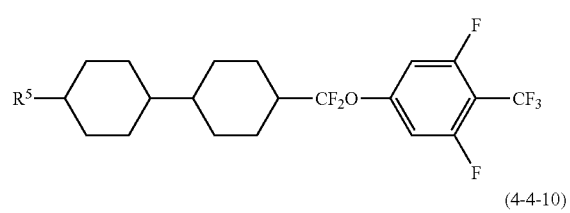

(4-4-10)
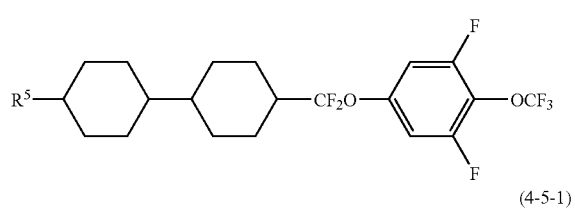

(4-5-1)
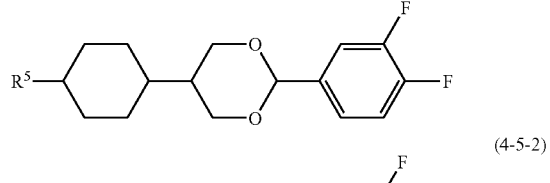

(4-5-2)
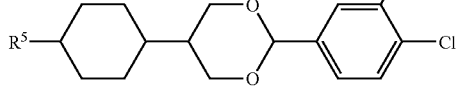

-continued (4-5-3)
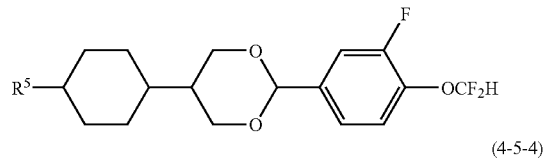

(4-5-4)
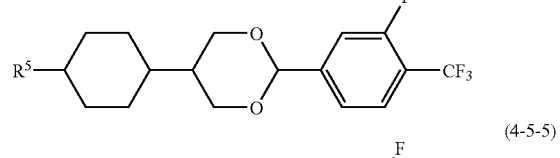

(4-5-5)
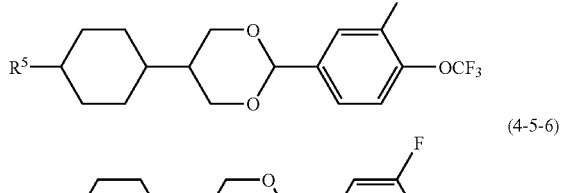

(4-5-6)
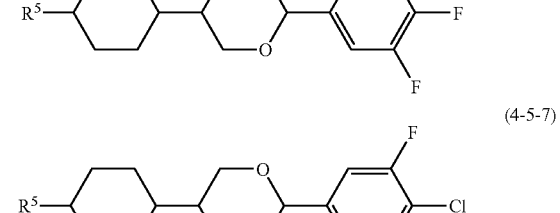

(4-5-7)
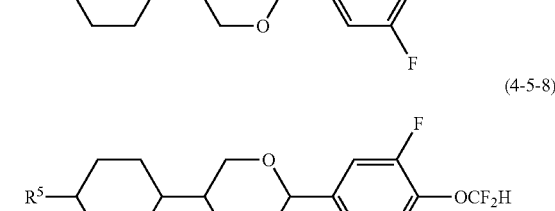

(4-5-8)
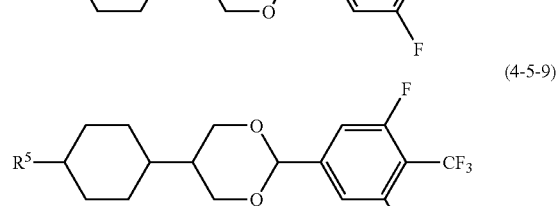

(4-5-9)

(4-5-10)
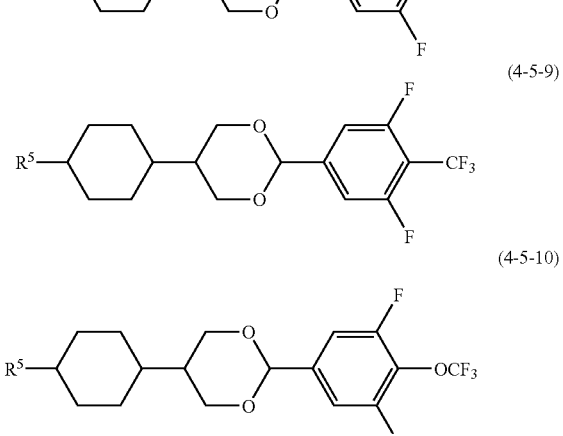

Sixth, the preparation methods of the component compounds will be explained. These compounds can be prepared by known methods. The preparation methods will be exemplified below. The compound (1-2) is prepared by the method disclosed in International Publication 98/17664. The compound (2-1) is prepared by the method disclosed in JP S59-70624 A/1984 and JPS60-16940 A/1985. The compound (2-3) is prepared by the method disclosed in JP S57-165328

A/1982. The compound (3-2) is prepared by the method disclosed in JP H4-501581 A/1992. The compounds (4-1-6), (4-2-6), (4-3-6) and (4-5-6) are prepared by the method disclosed in JP H2-233626 A/1990.

The compounds for which preparation methods were not described above can be prepared according to the methods described in ORGANIC SYNTHESES (John Wiley & Sons, Inc.), ORGANIC REACTIONS (John Wiley & Sons, Inc.), COMPREHENSIVE ORGANIC SYNTHESIS (Pergamon Press), NEW EXPERIMENTAL CHEMISTRY COURSE (Shin Jikken Kagaku Kouza) (Maruzen, Inc.), and so forth. The composition is prepared from the resulting compounds by known methods. For example, the component compounds are mixed and dissolved in each other by heating.

Seventh, additives capable of being mixed with the composition will be explained. The additive includes an optically active compound, a coloring matter, an antioxidant, an ultraviolet light absorbent and so forth. An optically active compound is mixed in the composition for inducing a helical structure of liquid crystal to provide a twist angle. Examples of the optically active compound include the compounds (6-1) to (64) below. A desirable ratio of the optically active compound is approximately 5% or less, and a more desirable ratio thereof ranges from approximately 0.01% to approximately 2%.

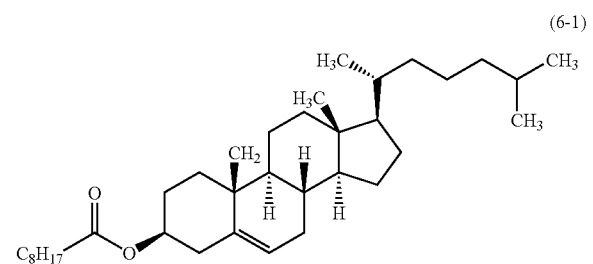
(6-1)

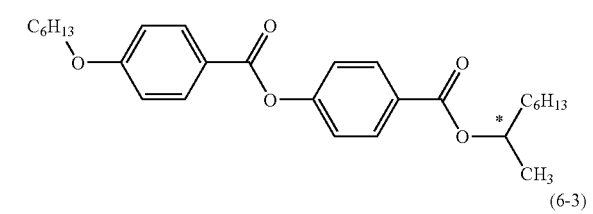
(6-2)

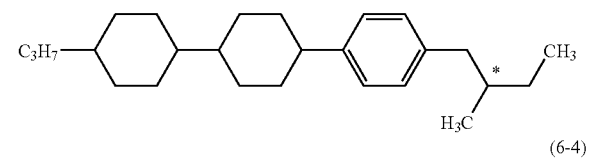
(6-3)

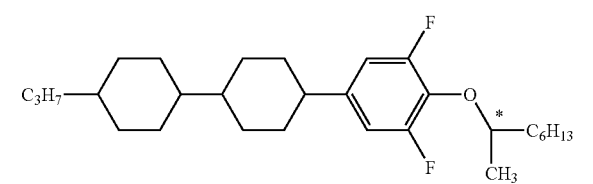
(6-4)

A dichroic dye, such as an azo dye and an anthraquinone dye, is mixed with the composition to suit for a device of a guest host (GH) mode. A desirable ratio of the dye ranges from approximately 0.01% to approximately 10%. An antioxidant is mixed with the composition in order to avoid a decrease in specific resistance caused by heating in the air, or to maintain a large voltage holding ratio at room temperature and also at a high temperature even after the device has been used for a long time. A desirable ratio of the antioxidant is approximately 50 ppm or more for obtaining the advantage thereof and is approximately 600 ppm or less for preventing the maximum temperature from being decreased and preventing the minimum temperature from being increased. A more desirable ratio thereof ranges from approximately 100 ppm to approximately 300 ppm.

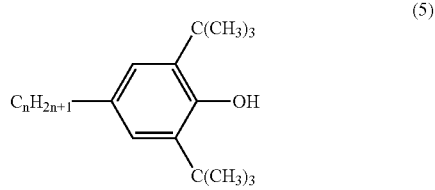
(5)

Preferred examples of the antioxidant include the compound (5) wherein n is an integer of from 1 to 9. In the compound (5), desirable n is 1, 3, 5, 7, or 9. More desirable n is 1 or 7. When n is 1, the compound (5) has a large volatility, and is effective in preventing the decrease of specific resistance caused by heating in the air. When n is 7, the compound (5) has a small volatility, and is effective in maintaining a large voltage holding ratio at room temperature and also at a high temperature even after the device has been used for a long time. The compound (5) wherein n is 1 is commercially available, for example, from Aldrich. The compound (5) wherein n is 7 can be synthesized according to the method described in U.S. Pat. No. 3,660,505.

Preferred examples of the ultraviolet light absorbent include a benzophenone derivative, a benzoate derivative and a triazole derivative. A desirable ratio of the ultraviolet light absorbent is approximately 50 ppm or more for obtaining the advantage thereof and is approximately 10,000 ppm or less for preventing the maximum temperature from being decreased and preventing the minimum temperature from being increased. A more desirable ratio thereof ranges from approximately 100 ppm to approximately 1,000 ppm.

Last, use of the composition will be explained. Most of the compositions have a minimum temperature of $-10°$ C. or less, a maximum temperature of $70°$ C. or more, and an optical anisotropy of approximately 0.06 to approximately 0.10. The device containing the composition has a large voltage holding ratio. The composition is suitable for an AM device. The composition is suitable especially for an AM device of a transmission type or a semi-transmission type. The composition having an optical anisotropy of approximately 0.06 to approximately 0.11 and further the composition having an optical anisotropy of approximately 0.05 to approximately 0.12 may be prepared by controlling ratios of the component compounds or by mixing other liquid crystal compounds. The composition can be used as a composition having a nematic phase and as an optically active composition by adding an optically active compound.

The composition can be used for an AM device. It can also be used for a PM device. The composition can also be used for an device having a mode such as PC, TN, STN, ECB, OCB, IPS, VA, and so forth. It is desirable to use the composition for a device having a mode of TN or OCB. These devices may be of a reflection type, a transmission type or a semi-transmission type. It is desirable to use the composition for a device of a transmission type. It can be used for an amorphous silicon-TFT device or a polycrystal silicon-TFT device. The composition is also usable for a nematic curvilinear aligned phase (NCAP) device prepared by microcapsulating the composition, and for a polymer dispersed (PD) device in which a three dimensional net-work polymer is formed in the composition, for example, a polymer network (PN) device.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention

EXAMPLES

The invention will be explained in detail by way of Examples. The invention is not limited by the Examples described below. The compounds described in the Comparative Examples and the Examples are expressed by the symbols according to the definition in Table 3. In Table 3, the configuration of 1,4-cyclohexylene and 1,3-dioxane-2,5-diyl is trans. The configuration regarding a bonding group of —CH=CH— is trans. The parenthesized number next to the symbolized compounds in the Examples corresponds to the number of the desirable compound. The symbol (-) means other liquid crystal compound. A ratio (percentage) of a liquid crystal compound is percentage by weight (% by weight) based on the total weight of liquid crystal compounds. Last, the characteristics of the composition are summarized.

TABLE 3

Method of Description of Compound using Symbols
R—(A1)—Z1— - - - —Zn—(An)—X

| | Symbol |
|---|---|
| 1) Left Terminal Group R— | |
| $C_nH_{2n+1}$— | n- |
| $C_nH_{2n+1}O$— | nO— |
| $C_mH_{2m+1}OC_nH_{2n}$— | mOn- |
| $CH_2$=CH— | V- |
| $CH_2$—CH=CH—$(CH_2)_2$— | IV2- |
| 2) Right Terminal Group —X | |
| —$C_nH_{2n+1}$ | -n |
| —$OC_nH_{2n+1}$ | —On |
| —F | —F |
| —Cl | —CL |
| —$OCF_3$ | —OCF3 |
| —$OCF_2CFHCF_3$ | —CHF2CFHCF3 |
| 3) Bonding Group —Zn— | |
| —$C_2H_4$— | 2 |
| —COO— | E |
| —CH=CH— | V |
| —C≡C— | T |
| —$CF_2O$— | X |
| 4) Ring Structure -An- | |
|  | H |
|  | B |
| 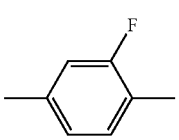 | B(F) |
| 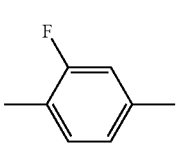 | B(2F) |

TABLE 3-continued

Method of Description of Compound using Symbols
R—(A1)—Z1— - - - —Zn—(An)—X

| Symbol | |
|---|---|
| 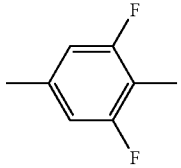 | B(F,F) |
| 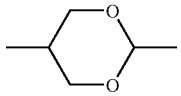 | G |

5) Example of Description

Example 1  5-HH-O2

C₅H₁₁—⟨H⟩—⟨H⟩—OC₂H₅

Example 2  3-HHEB(F)-OCF3

C₃H₇—⟨H⟩—⟨H⟩—COO—⟨B(F)⟩—OCF₃

Example 3  5-GHXB(F,F)-F

C₅H₁₁—⟨G⟩—⟨H⟩—CF₂O—⟨B(F,F)⟩—F

Example 4  4-HHEBH-4

C₃H₇—⟨H⟩—⟨H⟩—COO—⟨B⟩—⟨H⟩—C₄H₉

The composition is prepared by first measuring components such as a liquid crystal compound and then by mixing them. Thus, it is easy to calculate the percentage by weight of the component. However, it is not easy to calculate exactly the ratios of the components by analyzing the composition with gas chromatography because the correction coefficient depends on the kind of a liquid crystal compound. Fortunately, the correction coefficient is approximately 1. Furthermore, the difference of approximately 1% by weight only slightly influences on characteristics of the composition. Therefore, the peak area ratio of the component peaks in the gas chromatograph can be regarded as a percentage by weight of the component compound. Namely, the results of gas chromatographic analysis (peak area ratio) are considered to be equivalent to the percentage by weight of a liquid crystal compound without correction.

When a sample was a composition, it was measured as it was, and the obtained value is described here. When a sample was a compound, a sample for measurement was prepared by mixing 15% by weight of the compound and 85% by weight of mother liquid crystals. A value of characteristic of the compound was calculated by extrapolating from a value obtained by measurement. Namely: extrapolated value= (value measured−0.85×value measured for mother liquid crystals)/0.15. When a smectic phase (or crystals) separated out at this ratio at 25° C., a ratio of the compound and mother liquid crystals was changed step by step in the order of (10% by weight/90% by weight), (5% by weight/95% by weight), (1% by weight/99% by weight), respectively. Values for a maximum temperature, optical anisotropy, viscosity, and dielectric anisotropy of the compound were obtained by the extrapolation.

The composition of the mother liquid crystals is as shown below.

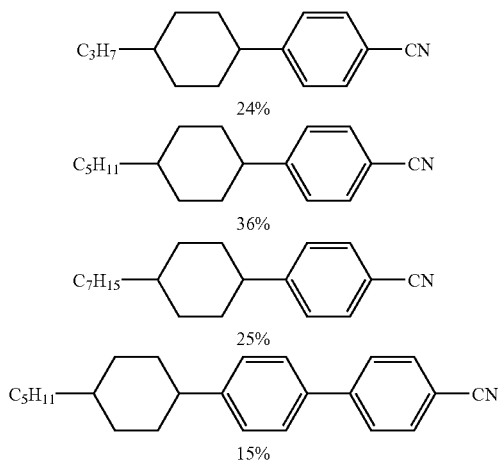

Measurement of the characteristics was carried out according to the following methods. Most methods are described in the Standard of Electric Industries Association of Japan, EIAJ ED-2521A or those with some modifications. A TFT was not attached to a TN device used for measurement.

Maximum Temperature of a Nematic Phase (NI; ° C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit of a temperature range of a nematic phase may be abbreviated to "a maximum temperature."

Minimum Temperature of a Nematic Phase (Tc; ° C.): A sample having a nematic phase was put in a glass vial and then kept in a freezer at temperatures of 0° C., −10° C., −20° C., −30° C., and −40° C. for ten days, respectively, and a liquid crystal phase was observed. For example, when the sample remained in a nematic phase at −20° C. and changed to crystals or a smectic phase at −30° C., Tc was expressed as ≦−20° C. A lower limit of a temperature range of a nematic phase may be abbreviated to "a minimum temperature."

Viscosity (η; mPa·s, measured at 20° C.): A viscosity was measured by means of an E-type viscometer.

Rotation Viscosity (γ1; measured at 25° C.; mPa·s): Rotation viscosity was measured according to the method disclosed in M. Imai, et al., *Molecular Crystals and Liquid Crystals*, Vol. 259, p. 37 (1995). A sample was placed in a TN device, in which a twist angle was 0°, and a cell gap between two glass plates was 5 μm. The TN device was impressed with a voltage in a range of from 16 V to 19.5 V stepwise by 0.5 V. After a period of 0.2 second with no impress of voltage, voltage impress was repeated with only one rectangular wave (rectangular pulse of 0.2 second) and application of no voltage (2 seconds). A peak current and a peak time of a transient current generated by the voltage impress were measured. Rotation viscosity was obtained from the measured values and the calculating equation (8) in the literature by M. Imai, et al., p. 40. As the dielectric anisotropy necessary for the calculation, the value measured by the method described below with the device for measuring the rotation viscosity was used.

Optical Anisotropy (Δn; measured at 25° C.): Measurement was carried out with an Abbe refractometer mounting a polarizing plate on an ocular using a light at a wavelength of 589 nm. The surface of a main prism was rubbed in one direction, and then a sample was dropped on the main prism. Refractive index n∥ was measured when the direction of a polarized light was parallel to that of the rubbing. Refractive index n⊥ was measured when the direction of a polarized light was perpendicular to that of the rubbing. A value of optical anisotropy was calculated from the equation; Δn=n∥−n⊥.

Dielectric Anisotropy (Δε; measured at 25° C.): A sample having a nematic phase was put in a TN device having a distance between two glass substrates (cell gap) of 9 μm and a twist angle of 80°. Sine waves (10 V, 1 kHz) were impressed onto the device, and a dielectric constant (ε∥) in a major axis direction of a liquid crystal molecule was measured after 2 seconds. Sine waves (0.5 V, 1 kHz) were impressed onto the device, and a dielectric constant (ε⊥) in a minor axis direction of a liquid crystal molecule was measured after 2 seconds. A value of a dielectric anisotropy was calculated from the equation; Δε=∥−γ⊥.

Threshold Voltage (Vth; measured at 25° C.; V): Measurement was carried out with LCD Evaluation System Model LCD-5100 made by Otsuka Electronics Co., Ltd. The light source was a halogen lamp. A sample was poured into a TN device of a normally white mode, in which a cell gap between two glass plates was about 0.45/Δn (μm), and a twist angle was 80°. Voltage to be impressed onto the device (32 Hz, rectangular waves) was stepwise increased by 0.02 volt starting from 0 V up to 10 V. During the stepwise increasing, the device was irradiated with light in a perpendicular direction, and an amount of the light passing through the device was measured. Voltage-transmission curve was prepared, in which a maximum amount of a light corresponded to 100% transmittance, a minimum amount of a light corresponded to 0% transmittance. Threshold voltage is a value at 90% transmittance.

Voltage Holding Ratio (VHR-1; measured at 25° C.; %): A TN device used for measurement has a polyimide-alignment film and the cell gap between two glass plates is 5 μm. A sample was poured into the device, and then the device was sealed with an adhesive which is polymerized by the irradiation of an ultraviolet light. The TN device was impressed and charged with pulse voltage (60 microseconds at 5 V). Decreasing voltage was measured for 16.7 milliseconds with High Speed Voltmeter and the area A between a voltage curve and a horizontal axis in a unit cycle was obtained. The area B was an area without decreasing. Voltage holding ratio is a percentage of the area A to the area B.

Stability to Ultraviolet Ray: After irradiation with an ultraviolet ray, a voltage holding ratio (VHR-2; measured at 25° C.; %) and a maximum temperature (NI(UV)) were measured for evaluation of stability to an ultraviolet ray. A composition having large VHR-2 has a high stability to an ultraviolet ray. A TN device used for the measurement has a polyimide-alignment film and the cell gap between two glass plates is 5 μm. A sample was poured into the device, and the device was irradiated with light for 200 minutes. A light source was a superhigh voltage mercury lamp USH-500D (produced by Ushio, Inc.), and a distance between the device and the light source was 20 cm. In the measurement of VHR-2, decreasing voltage was measured for a period of 16.7 milliseconds.

Heat Stability: A TN device having a sample poured therein was heated in a constant-temperature bath at 120° C. for 500 hours, and then a voltage holding ratio (VHR-3; 25° C.; %) and a maximum temperature (NI(H)) were measured for evaluation of stability to heat. A composition having large VHR-3 has a high stability to heat. A composition having a small difference between NI and NI(H) has a high stability to heat. In the measurement of VHR-3, decreasing voltage was measured for a period of 1,667 milliseconds.

Response Time (τ; measured at 25° C.; millisecond): Measurement was carried out with LCD Evaluation System Model LCD-5100 made by Otsuka Electronics Co., Ltd. The light source is a halogen lamp and the low-pass filter was set at 5 kHz. A sample was poured into a TN device of a normally white mode, in which a cell gap between two glass plates was 5.0 (μm), and a twist angle was 80°. Rectangle waves (60 Hz, 5 V, 0.5 seconds) was impressed to the device. During impressing, the device was irradiated with light in a perpendicular direction, and an amount of the light passing through the device was measured. A maximum amount of a light corresponds to 100% transmittance, and a minimum amount of a light corresponds to 0% transmission. Rise time (τr) is a period of time reqited for the change in transmittance from 90% to 10%. Fall time (τf) is a period of time required for the change in transmittance from 10% to 90%. Response time is a sum of the rise time and the fall time thus obtained.

Gas Chromatographic Analysis: A gas Chromatograph Model GC-14B made by Shimadzu was used for measurement. The carrier gas was helium (2 milliliters per minute). An evaporator and a detector (FID) were set up at 280° C. and 300° C., respectively. Capillary column DB-1 (length 30 meters, bore 0.32 millimeters, film thickness 0.25 micrometers, dimethylpolysiloxane as stationary phase, no polarity) made by Agilent Technologies, Inc. was used for the separation of the component compound. After the column had been kept at 200° C. for 2 minutes, it was further heated to 280° C. at the rate of 5° C. per minute. A sample was prepared into an acetone solution (0.1% by weight), and 1 microliter of the solution was injected into the evaporator. The recorder used was a Chromatopac Model C-R5A made by Shimadzu or its equivalent. Gas chromatogram obtained showed a retention time of a peak and a peak area corresponding to the component compound.

Solvents for diluting the sample may also be chloroform, hexane, and so forth. The following capillary columns may also be used: HP-1 made by Agilent Technologies Inc. (length 30 meters, bore 0.32 millimeters, film thickness 0.25 micrometers), Rtx-1 made by Restek Corporation (length 30 meters, bore 0.32 millimeters, film thickness 0.25 micrometers), and BP-1 made by SGE International Pty. Ltd. (length 30 meters, bore 0.32 millimeters, film thickness 0.25 micrometers). In order to prevent compound peaks from overlapping, a capillary column CBP1-M50-025 (50 meters, bore 0.25 millimeters, film thickness 0.25 micrometers) made by Shimaddzu Corporation may be used. An area ratio of each peak in the gas chromatogram corresponds to a ratio of the component compound. Percentage by weight of the component compound is not completely identical to an area ratio of each peak. According to the invention, however, percentage by weight of the component compound may be regarded to be identical to an area ratio of each peak, when these capillary columns are used because there is no significant difference in correction efficient of component compounds.

Comparative Example 1

Example 6 was chosen from the compositions disclosed in JP 2004-352992 A/2004. The basis is that the composition contains the compounds (1) and (2) of the invention and has a small optical anisotropy. The components and characteristics of the composition are as follows.

| | | |
|---|---|---|
| 3-HH-O1 | (2-2) | 8% |
| 1-HHB(F,F)-F | (4-2-6) | 7% |
| 2-HHB(F,F)-F | (4-2-6) | 7% |
| 3-HHB(F,F)-F | (4-2-6) | 7% |
| 5-HHB(F,F)-F | (4-2-6) | 3% |
| 2-HHXB(F,F)-F | (4-4-6) | 11% |
| 3-HHXB(F,F)-F | (4-4-6) | 12% |
| 5-HHXB(F,F)-F | (4-4-6) | 8% |
| 3-HH1OH-3 | (—) | 3% |
| 4-HH1OH-3 | (—) | 4% |
| 3-HH1OH-5 | (—) | 2% |
| 3-HHB(F)B(F,F)-F | (—) | 3% |
| 2-GHXB(F,F)-F | (1-2) | 6% |
| 3-GHXB(F,F)-F | (1-2) | 8% |
| 5-GHXB(F,F)-F | (1-2) | 8% |
| IS-8720 | (—) | 3% |

NI=88.0° C.; Tc≦−10° C.; Δn=0.066; Δε=12.4; η=33.7 mPa·s; Vth=1.32 V; VHR-1=99.2%; VHR-2=91.7%.

Example 1

The composition of Example 1 had a low Δn and a low minimum temperature as compared to the composition of Comparative Example 1.

| | | |
|---|---|---|
| 3-GHXB(F,F)-F | (1-2) | 8% |
| 4-GHXB(F,F)-F | (1-2) | 8% |
| 5-GHXB(F,F)-F | (1-2) | 8% |
| 2-HH-3 | (2-1) | 7% |
| 3-HH-4 | (2-1) | 3% |
| 3-HH-O1 | (2-2) | 22% |
| 5-HH-O1 | (2-2) | 22% |
| 3-HHEH-3 | (3-1) | 3% |
| 3-HHEH-5 | (3-1) | 3% |
| 4-HHEH-3 | (3-1) | 3% |
| 4-HHEH-5 | (3-1) | 3% |
| 3-HHEBH-3 | (3-2) | 3% |
| 3-HHEBH-4 | (3-2) | 4% |
| 3-HHEBH-5 | (3-2) | 3% |

NI=84.9° C.; Tc≦−30° C.; Δn=0.053; Δε=4.4; η=19.2 mPa·s; Vth=1.95 V; VHR-1=99.5%; VHR-2=98.4%.

Example 2

| | | |
|---|---|---|
| 3-GHXB(F)-OCF3 | (1-1) | 6% |
| 5-GHXB(F)-OCF3 | (1-1) | 6% |
| 3-GHXB(F,F)-OCF3 | (1-3) | 4% |
| 4-GHXB(F,F)-OCF3 | (1-3) | 4% |
| 5-GHXB(F,F)-OCF3 | (1-3) | 4% |
| 3-HH-O1 | (2-2) | 22% |
| 5-HH-O1 | (2-2) | 22% |
| 3-HHB-1 | (2-3) | 7% |
| 3-HHB-O1 | (2-4) | 3% |
| 3-HHEH-3 | (3-1) | 3% |
| 3-HHEH-5 | (3-1) | 3% |
| 4-HHEH-3 | (3-1) | 3% |
| 4-HHEH-5 | (3-1) | 3% |
| 3-HHEBH-3 | (3-2) | 3% |
| 3-HHEBH-4 | (3-2) | 4% |
| 3-HHEBH-5 | (3-2) | 3% |

NI=86.1° C.; Tc≦−30° C.; Δn=0.054; Δε=4.3; η=20.8 mPa·s; Vth=1.99 V; VHR-1=99.6%; VHR-2=98.6%.

Example 3

| | | |
|---|---|---|
| 3-GHXB(F,F)-F | (1-2) | 7% |
| 3-HH-O1 | (2-2) | 5% |
| 4-HHEH-3 | (3-1) | 5% |
| 4-GHB(F,F)-F | (4-1-6) | 8% |
| 5-GHB(F,F)-F | (4-1-6) | 8% |
| 2-HHB(F)-F | (4-2-1) | 6% |
| 3-HHB(F)-F | (4-2-1) | 6% |
| 3-HHB(F)-OCF2H | (4-2-3) | 3% |
| 3-HHB(F)-OCF3 | (4-2-5) | 7% |
| 5-HHB(F)-OCF3 | (4-2-5) | 7% |
| 1-HHXB(F,F)-F | (4-4-6) | 18% |
| 3-HHXB(F,F)-F | (4-4-6) | 20% |

NI=85.1° C.; Tc≦−30° C.; Δn=0.066; Δε=12.7; η=30.3 mPa·s; Vth=1.12 V; VHR-1=99.2%; VHR-2=98.3%.

Example 4

| | | |
|---|---|---|
| 3-GHXB(F,F)-F | (1-2) | 7% |
| 3-HH-O1 | (2-2) | 5% |
| 4-HHEH-3 | (3-1) | 5% |
| 3-GHB(F)-F | (4-1-1) | 4% |
| 5-GHB(F)-F | (4-1-1) | 4% |
| 3-GHB(F)-OCF3 | (4-1-5) | 4% |
| 5-GHB(F)-OCF3 | (4-1-5) | 4% |
| 3-HHB(F)-CL | (4-2-2) | 3% |
| 2-HHB(F)-CF3 | (4-2-4) | 3% |
| 1-HHB(F,F)-F | (4-2-6) | 7% |
| 3-HHB(F,F)-OCF2H | (4-2-8) | 7% |
| 3-HHEB(F)-F | (4-3-1) | 7% |
| 2-HHEB(F,F)-F | (4-3-6) | 2% |
| 3-HHEB(F,F)-F | (4-3-6) | 5% |
| 3-HHXB(F)-F | (4-4-1) | 3% |
| 3-HHXB(F)-OCF2H | (4-4-3) | 10% |
| 5-HHXB(F)-OCF3 | (4-4-5) | 10% |
| 1-HHXB(F,F)-OCF2H | (4-4-8) | 10% |

NI=80.4° C.; Tc≦−30° C.; Δn=0.062; Δε=13.8; η=31.1 mPa·s; Vth=0.98 V; VHR-1=99.2%; VHR-2=97.9%.

Example 5

| | | |
|---|---|---|
| 3-GHXB(F,F)-F | (1-2) | 7% |
| 3-HH-O1 | (2-2) | 5% |
| 3-HHEBH-5 | (3-2) | 7% |
| 4-GHB(F)-CL | (4-1-2) | 4% |
| 3-GHB(F)-OCF2H | (4-1-3) | 4% |
| 5-GHB(F)-CL | (4-1-7) | 4% |
| 3-GHB(F,F)-OCF2H | (4-1-8) | 4% |
| 2-GHB(F,F)-CF3 | (4-1-9) | 4% |
| 1-GHB(F,F)-OCF3 | (4-1-10) | 4% |
| 2-HHB(F)-CF3 | (4-2-9) | 7% |
| 3-HHB(F)-OCF3 | (4-2-10) | 7% |
| 3-HHEB(F)-OCF2H | (4-3-3) | 5% |
| 3-HHEB(F,F)-OCF2H | (4-3-8) | 5% |
| 3-HHEB(F,F)-OCF3 | (4-3-10) | 5% |
| 2-HHXB(F)-CL | (4-4-2) | 5% |
| 3-HHXB(F)-CF3 | (4-4-4) | 5% |
| 3-HHXB(F,F)-CL | (4-4-7) | 3% |
| 3-HHXB(F,F)-CF3 | (4-4-9) | 3% |
| 3-HGB(F)-F | (4-5-1) | 3% |
| 3-HGB(F)-OCF2H | (4-5-3) | 3% |
| 3-HGB(F)-OCF3 | (4-5-5) | 3% |
| 3-HGB(F,F)-F | (4-5-6) | 3% |

NI=83.4° C.; Tc≦−30° C.; Δn=0.059; Δε=13.8; η=31.9 mPa·s; Vth=0.98 V; VHR-1=99.3%; VHR-2=98.0%.

Example 6

| | | |
|---|---|---|
| 3-GHXB(F,F)-F | (1-2) | 8% |
| 4-GHXB(F,F)-F | (1-2) | 8% |
| 5-GHXB(F,F)-F | (1-2) | 8% |
| 3-HH-O1 | (2-2) | 22% |
| 5-HH-O1 | (2-2) | 22% |
| V-HHB-1 | (2-3) | 5% |
| 3-HHEH-3 | (3-1) | 5% |
| 4-GHB(F)-CF3 | (4-1-4) | 4% |
| 5-HHB(F,F)-CL | (4-2-7) | 4% |
| 3-HHEB(F)-CF3 | (4-3-4) | 4% |
| 3-HHEB(F,F)-CF3 | (4-3-9) | 4% |
| 3-HGB(F)-CF3 | (4-5-4) | 3% |
| 5-HGB(F,F)-CF3 | (4-2-9) | 3% |

NI=82.0° C.; Tc≦−30° C.; Δn=0.057; Δε=6.4; η=21.3 mPa·s; Vth=1.73 V; VHR-1=99.5%; VHR-2=98.5%.

Example 7

| | | |
|---|---|---|
| 3-GHXB(F,F)-F | (1-2) | 8% |
| 4-GHXB(F,F)-F | (1-2) | 8% |
| 5-GHXB(F,F)-F | (1-2) | 8% |
| V-HH-O1 | (2-2) | 4% |
| 3-HH-O1 | (2-2) | 20% |
| 5-HH-O1 | (2-2) | 16% |
| 3-HHEBH-3 | (3-2) | 4% |
| 3-HHEBH-4 | (3-2) | 3% |
| 3-HHEBH-5 | (3-2) | 3% |
| 2-HHEB(F,F)-CL | (4-3-7) | 4% |
| 3-HHXB(F,F)-OCF3 | (4-4-10) | 4% |
| 5-HGB(F)-CL | (4-5-2) | 4% |
| 5-HGB(F,F)-CL | (4-5-7) | 4% |
| 3-HGB(F,F)-OCF2H | (4-5-8) | 5% |
| 1-HGB(F,F)-OCF3 | (4-5-10) | 5% |

NI=84.1° C.; Tc≦−30° C.; Δn=0.061; Δε=5.7; η=19.9 mPa·s; Vth=1.83 V; VHR-1=99.4%; VHR-2=98.7%.

Example 8

| | | |
|---|---|---|
| 3-GHXB(F,F)-F | (1-2) | 8% |
| 4-GHXB(F,F)-F | (1-2) | 8% |
| 5-GHXB(F,F)-F | (1-2) | 8% |
| 3-HH-O1 | (2-2) | 24% |
| 5-HH-O1 | (2-2) | 16% |
| 3-HHEH-3 | (3-1) | 3% |
| 3-HHEH-5 | (3-1) | 3% |
| 4-HHEH-3 | (3-1) | 2% |
| 4-HHEH-5 | (3-1) | 2% |
| 2-HHEB(F)-CL | (4-3-2) | 4% |
| 3-HHEB(F)-OCF3 | (4-3-5) | 4% |
| 1-HHXB(F)-CL | (4-4-2) | 4% |
| 3-HHXB(F)-OCF3 | (4-4-5) | 4% |
| 5-HXB(F,F)-F | (—) | 5% |
| 3-HHBB(F,F)-F | (—) | 5% |

NI=81.7° C.; Tc≦−30° C.; Δn=0.060; Δε=5.8; η=20.6 mPa·s; Vth=1.79 V; VHR-1=99.4%; VHR-2=98.7%.

Example 9

| | | |
|---|---|---|
| 3-GHXB(F)-OCF3 | (1-1) | 10% |
| 2-GHXB(F,F)-OCF3 | (1-3) | 7% |
| 5-GHXB(F,F)-OCF3 | (1-3) | 7% |
| 3-HH-4 | (2-1) | 5% |
| 3-HH-V | (2-1) | 5% |
| V-HHB-1 | (2-3) | 5% |
| 3-HHEBH-3 | (3-2) | 5% |
| 3-GHB(F,F)-F | (4-1-6) | 4% |
| 4-GHB(F,F)-F | (4-1-6) | 6% |
| 5-GHB(F,F)-F | (4-1-6) | 6% |
| 1-HHB(F,F)-F | (4-2-6) | 5% |
| 3-HHB(F,F)-F | (4-2-6) | 5% |
| 3-HHEB(F)-F | (4-3-1) | 5% |
| 3-HHEB(F)-OCF3 | (4-3-5) | 5% |
| 1-HHXB(F,F)-F | (4-4-6) | 5% |
| 2-HHXB(F,F)-F | (4-4-6) | 5% |
| 3-HHXB(F,F)-F | (4-4-6) | 5% |
| 5-HHXB(F,F)-F | (4-4-6) | 5% |

NI=83.4° C.; Tc≦−30° C.; Δn=0.063; Δε=7.8; η=24.1 mPa·s; Vth=1.83 V; VHR-1=99.3%; VHR-2=98.1%.

Example 10

| | | |
|---|---|---|
| 3-GHXB(F)-OCF3 | (1-1) | 10% |
| 1-GHXB(F,F)-F | (1-2) | 7% |
| 3-GHXB(F,F)-F | (1-2) | 7% |
| 3-HH-O1 | (2-2) | 10% |
| 3-HHB-O1 | (2-4) | 5% |
| 3-HHEBH-5 | (3-2) | 5% |
| 1-GHB(F,F)-F | (4-1-6) | 4% |
| 5-GHB(F,F)-OCF2H | (4-1-8) | 4% |
| 2-HHB(F)-F | (4-2-1) | 4% |
| 3-HHB(F)-OCF3 | (4-2-5) | 4% |
| 3-HHB(F,F)-F | (4-2-6) | 5% |
| 3-HHB(F,F)-OCF2H | (4-2-8) | 5% |
| 1-HHXB(F)-OCF3 | (4-4-5) | 10% |
| 3-HHXB(F,F)-F | (4-4-6) | 10% |
| 2-HHB(F)-OCF3 | (4-5-5) | 5% |
| 3-HHB(F,F)-F | (4-5-6) | 5% |

NI=82.9° C.; Tc≦−30° C.; Δn=0.061; Δε=7.6; η=23.6 mPa·s; Vth=1.70 V; VHR-1=99.3%; VHR-2=98.2%.

Example 11

| | | |
|---|---|---|
| 3-GHXB(F,F)-F | (1-2) | 8% |
| 4-GHXB(F,F)-F | (1-2) | 8% |
| 5-GHXB(F,F)-F | (1-2) | 8% |
| 3-HB-O2 | (—) | 7% |
| 3-HH-O4 | (2-1) | 3% |
| 3-HH-O1 | (2-2) | 22% |
| 5-HH-O1 | (2-2) | 22% |
| 3-HHEH-3 | (3-1) | 3% |
| 3-HHEH-5 | (3-1) | 3% |
| 4-HHEH-3 | (3-1) | 3% |
| 4-HHEH-5 | (3-1) | 3% |
| 3-HB(F)BH-3 | (—) | 3% |

-continued

| | | |
|---|---|---|
| 3-HHEBH-4 | (3-2) | 4% |
| 3-HHEBH-5 | (3-2) | 3% |

NI=84.1° C.; Tc≦−30° C.; Δn=0.059; Δε=4.4; η=19.0 mPa·s; Vth=1.97 V; VHR-1=99.5%; VHR-2=98.2%.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention

What is claimed is:

1. A liquid crystal composition having a nematic phase comprising three components, wherein the first component is at least one compound selected from the group of compounds represented by formula (1), the second component is at least one compound selected from the group of compounds represented by formula (2), and the third component is at least one compound selected from the group of compounds represented by formula (3):

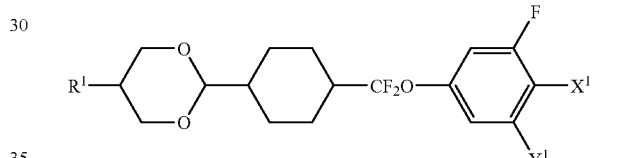

(1)

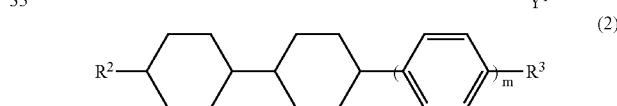

(2)

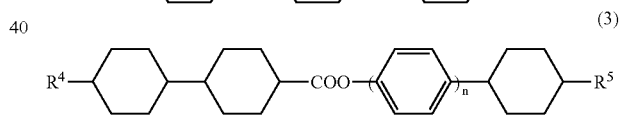

(3)

wherein $R^1$ and $R^2$ are each independently alkyl having approximately 1 to approximately 12 carbons or alkenyl having approximately 2 to approximately 12 carbons; $R^3$ is alkyl having approximately 1 to approximately 12 carbons or alkoxy having approximately 1 to approximately 12 carbons; $R^4$ and $R^5$ are each independently alkyl having approximately 1 to approximately 12 carbons; $X^1$ is fluorine, chlorine, —OCF$_2$H, —CF$_3$ or —OCF$_3$; $Y^1$ is hydrogen or fluorine; and m and n are each independently 0 or 1.

2. The liquid crystal composition according to claim 1, wherein the ratio of the first component is in a range of from approximately 5% to approximately 40% by weight, the ratio of the second component is in a range of from approximately 5% to approximately 70% by weight, and the ratio of the third component is in a range of from approximately 5% to approximately 30% by weight, based on the total weight of the liquid crystal compounds.

3. A liquid crystal according to claim 1, wherein the first component is at least one compound selected from the group of compounds represented by formula (1), the second component is at least one compound selected from the group of compounds represented by formula (2), the third component is at least one compound selected from the group of compounds represented by formula (3), and the fourth component is at least one compound selected from the group of compounds represented by formulas (4-1) to (4-5):

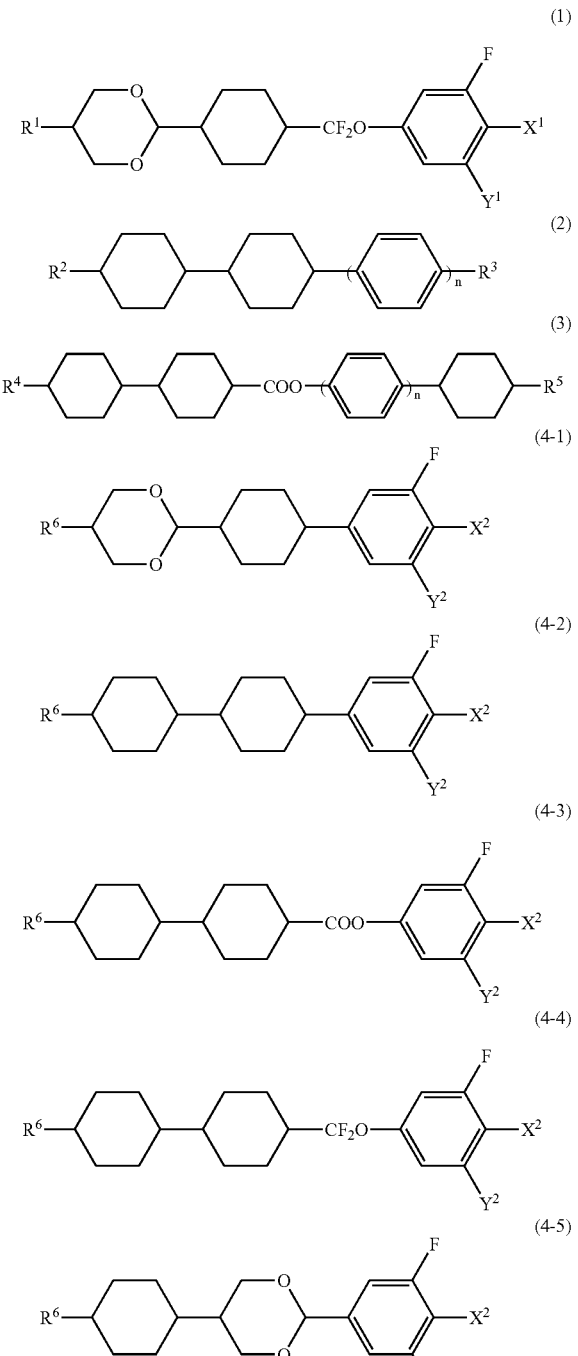

wherein $R^1$ and $R^2$ are each independently alkyl having approximately 1 to approximately 12 carbons or alkenyl having approximately 2 to approximately 12 carbons; $R^3$ is alkyl having approximately 1 to approximately 12 carbons or alkoxy having approximately 1 to approximately 12 carbons; $R^4$ and $R^5$ are each independently alkyl having approximately 1 to approximately 12 carbons; $R^6$ is alkyl having approximately 1 to approximately 12 carbons; $X^1$ and $X^2$ are each independently fluorine, chlorine, —OCF$_2$H, —CF$_3$ or —OCF$_3$; and $Y^1$ and $Y^2$ are each independently hydrogen or fluorine; and m and n are each independently 0 or 1.

4. The liquid crystal composition according to claim 3, wherein the ratio of the first component is in a range of from approximately 5% to approximately 40% by weight, the ratio of the second component is in a range of from approximately 5% to approximately 70% by weight, the ratio of the third component is in a range of from approximately 5% to approximately 30% by weight, and the ratio of the fourth component is in a range of from approximately 5% to approximately 80% by weight, based on the total weight of the liquid crystal compounds.

5. A liquid crystal according to claim 1, consisting essentially of four components, wherein the first component is at least one compound selected from the group of compounds represented by formula (1), the second component is at least one compound selected from the group of compounds represented by formula (2), the third component is at least one compound selected from the group of compounds represented by formula (3), the fourth component is at least one compound selected from the group of compounds represented by formulas (4-1) to (4-5):

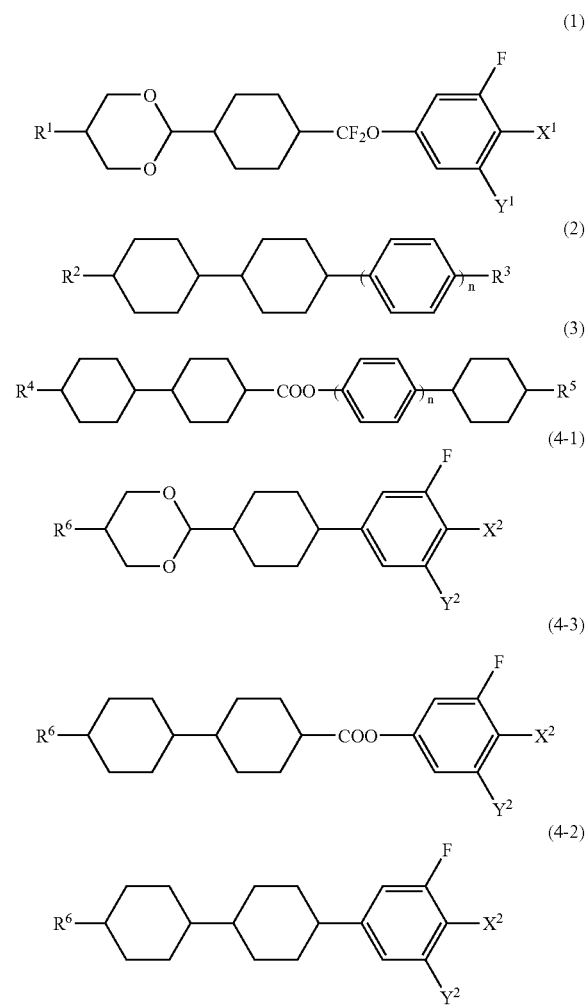

-continued

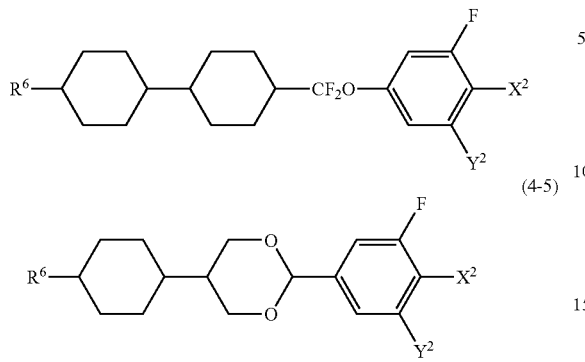

wherein $R^1$ and $R^2$ are each independently alkyl having approximately 1 to approximately 12 carbons or alkenyl having approximately 2 to approximately 12 carbons; $R^3$ is alkyl having approximately 1 to approximately 12 carbons or alkoxy having approximately 1 to approximately 12 carbons; $R^4$ and $R^5$ are each independently alkyl having approximately 1 to approximately 12 carbons; $R^6$ is alkyl having 1 to 12 carbons; $X^1$ and $X^2$ are each independently fluorine, chlorine, —$OCF_2H$, —$CF_3$ or —$OCF_3$; $Y^1$ and $Y^2$ are each independently hydrogen or fluorine; and m and n are each independently 0 or 1.

6. The liquid crystal composition according to claim 5, wherein the ratio of the first component is in a range of from approximately 5% to approximately 40% by weight, the ratio of the second component is in a range of from approximately 5% to approximately 70% by weight, the ratio of the third component is in a range of from approximately 5% to approximately 30% by weight, and the ratio of the fourth component is in a range of from approximately 5% to approximately 80% by weight, based on the total weight of the liquid crystal compounds.

7. A liquid crystal composition according to claim 1, consisting essentially of four components, wherein the first component is at least one compound selected from the group of compounds represented by formula (1), the second component is at least one compound selected from the group of compounds represented by formula (2), the third component is at least one compound selected from the group of compounds represented by formula (3), and the fourth component is at least one compound selected from the group of compounds represented by formulas (4-2) and (4-4):

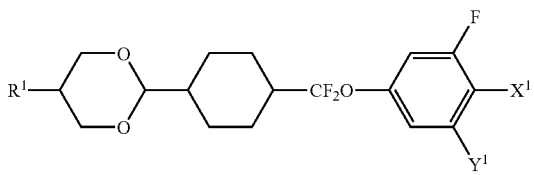

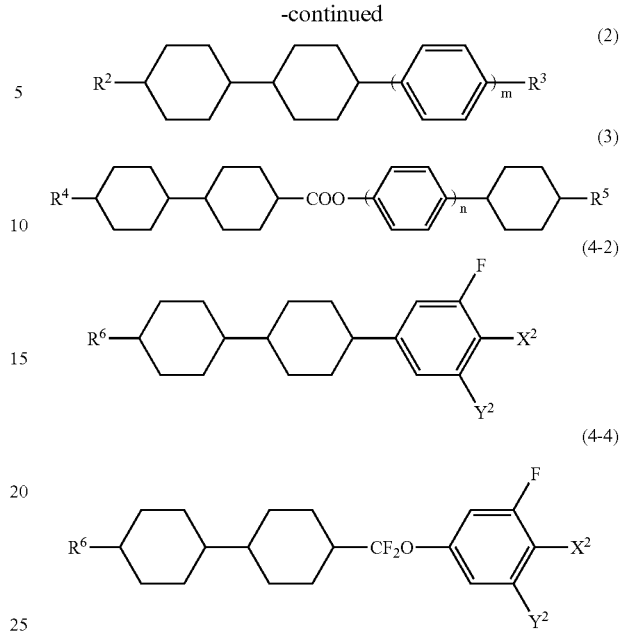

wherein $R^1$ and $R^2$ are each independently alkyl having approximately 1 to approximately 12 carbons or alkenyl having approximately 2 to approximately 12 carbons; $R^3$ is alkyl having approximately 1 to approximately 12 carbons or alkoxy having approximately 1 to approximately 12 carbons; $R^4$ and $R^5$ are each independently alkyl having approximately 1 to approximately 12 carbons; $R^6$ is alkyl having approximately 1 to approximately 12 carbons; $X^1$ and $X^2$ are each independently fluorine, chlorine, —$OCF_2H$, —$CF_3$ or —$OCF_3$; $Y^1$ and $Y^2$ are each independently hydrogen or fluorine; and m and n are each independently 0 or 1.

8. The liquid crystal composition according to claim 1, wherein the liquid crystal composition further comprises an ultraviolet light absorbent.

9. The liquid crystal composition according to claim 3, wherein the liquid crystal composition further comprises an ultraviolet light absorbent.

10. The liquid crystal composition according to claim 5, wherein the liquid crystal composition further comprises an ultraviolet light absorbent.

11. The liquid crystal composition according to claim 7, wherein the liquid crystal composition further comprises an ultraviolet light absorbent.

12. A liquid crystal display device comprising the liquid crystal composition according to claim 1.

13. A liquid crystal display device comprising the liquid crystal composition according to claim 3.

14. A liquid crystal display device comprising the liquid crystal composition according to claim 5.

15. A liquid crystal display device comprising the liquid crystal composition according to claim 7.

* * * * *